United States Patent [19]
Honegger

[11] Patent Number: 5,865,295
[45] Date of Patent: Feb. 2, 1999

[54] APPARATUS FOR CONVEYING ARTICLES, IN PARTICULAR SHEET-LIKE, FLEXIBLE, PRODUCTS

[75] Inventor: Werner Honegger, Bach, Switzerland

[73] Assignee: Ferag, AG, Himwil, Switzerland

[21] Appl. No.: 543,325

[22] Filed: Oct. 16, 1995

[30] Foreign Application Priority Data

Jan. 3, 1995 [CH] Switzerland ............... 00 009/95

[51] Int. Cl.$^6$ ................................... B65G 37/00
[52] U.S. Cl. ............................. 198/604; 198/778
[58] Field of Search ................. 198/347.1, 347.4, 198/347.3, 778, 604, 607, 811; 271/277, 204, 205

[56] References Cited

U.S. PATENT DOCUMENTS

| | | | |
|---|---|---|---|
| 2,763,110 | 9/1956 | Stuart | 198/347.1 X |
| 3,750,859 | 8/1973 | Smith | 198/778 |
| 4,320,894 | 3/1982 | Reist et al. | 271/277 |
| 4,697,400 | 10/1987 | Gerber. | |
| 4,828,242 | 5/1989 | Kobler et al.. | |
| 4,889,146 | 12/1989 | Beal | 198/778 X |
| 5,029,843 | 7/1991 | Kobler. | |
| 5,191,267 | 3/1993 | Machacek | 198/778 X |
| 5,201,910 | 4/1993 | Sheeter | 198/347.3 |
| 5,413,213 | 5/1995 | Golz et al. | 198/778 |
| 5,579,889 | 12/1996 | Maag et al. | 198/347.3 |

FOREIGN PATENT DOCUMENTS

| | | |
|---|---|---|
| EP-A-0229888 | 7/1987 | European Pat. Off.. |
| EP-A-0359727 | 3/1990 | European Pat. Off.. |
| EP-A-0387726 | 9/1990 | European Pat. Off.. |
| 36 21 834 | 9/1987 | Germany. |

*Primary Examiner*—Donald W. Underwood
*Attorney, Agent, or Firm*—Brinks Hofer Gilson & Lione

[57] ABSTRACT

A conveying device is formed by two conveying sections which are arranged one behind the other and run in the form of a spiral. The first conveying section runs from an exterior inlet towards a center, whereas the other conveying section leads from the center to an exterior outlet. The conveying sections have opposite run-through directions. The windings of one conveying section run in each case between the windings of the other conveying section. In order to convey the conveyable articles, a conveying arrangement is used which serves jointly for the two conveying sections and comprises an endless, driven conveying belt and a stationary roller path located opposite the conveying belt. This design of the conveying device with two conveying sections, which are in the form of a spiral, engage one another, and have opposite conveying directions, provides an extremely compact arrangement.

46 Claims, 12 Drawing Sheets

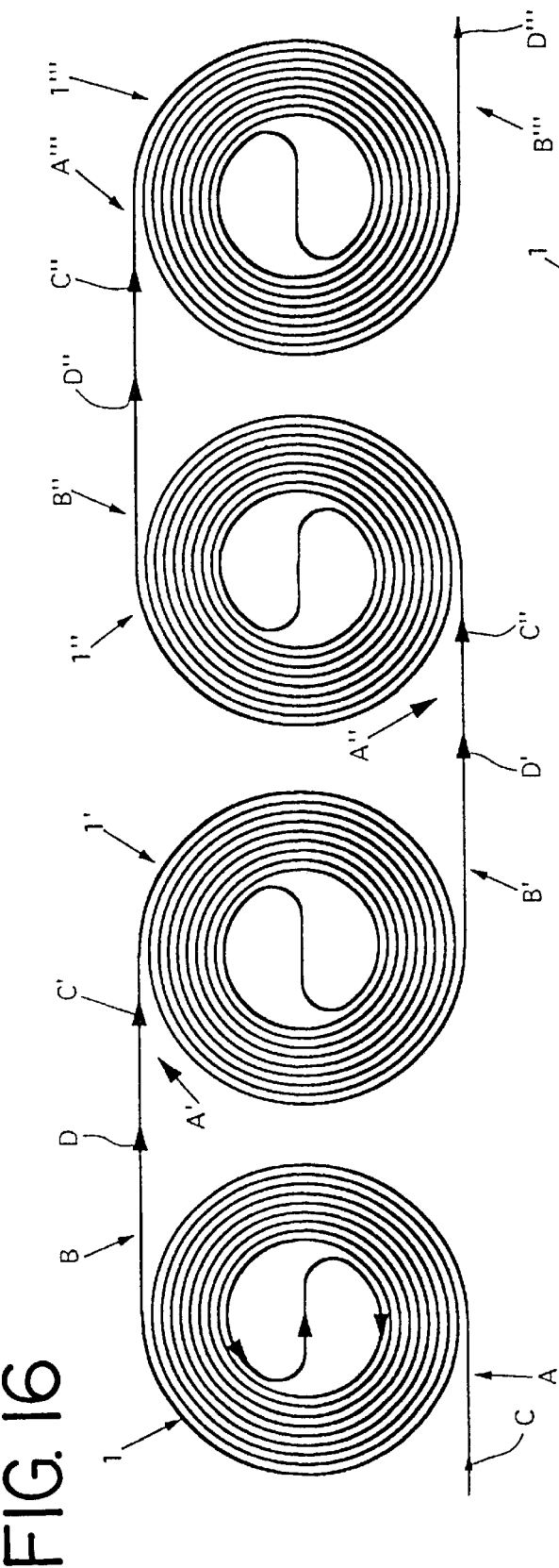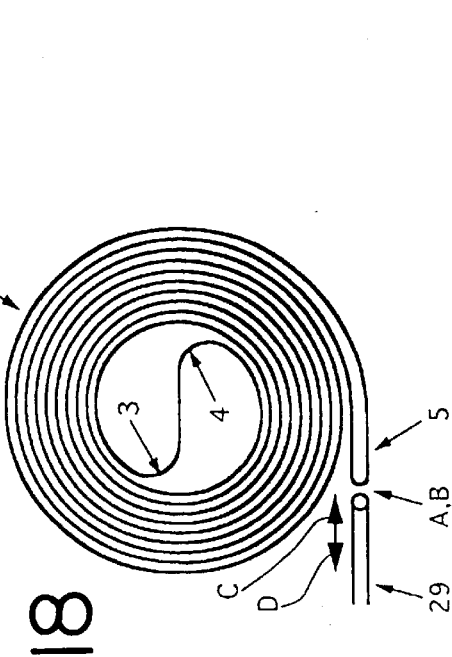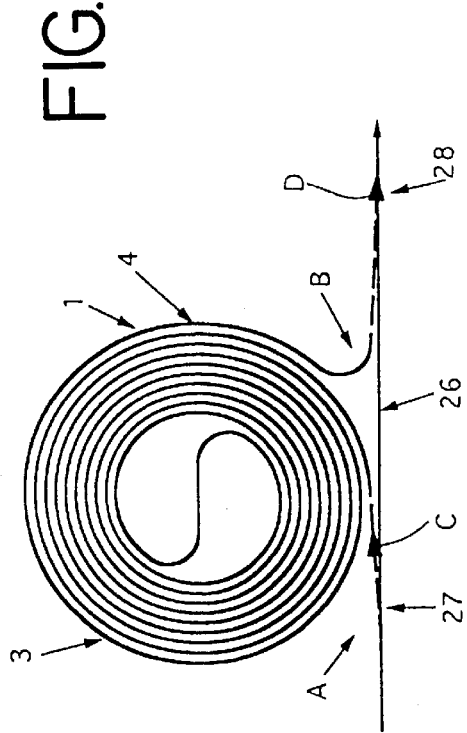
FIG. 16
FIG. 17
FIG. 18

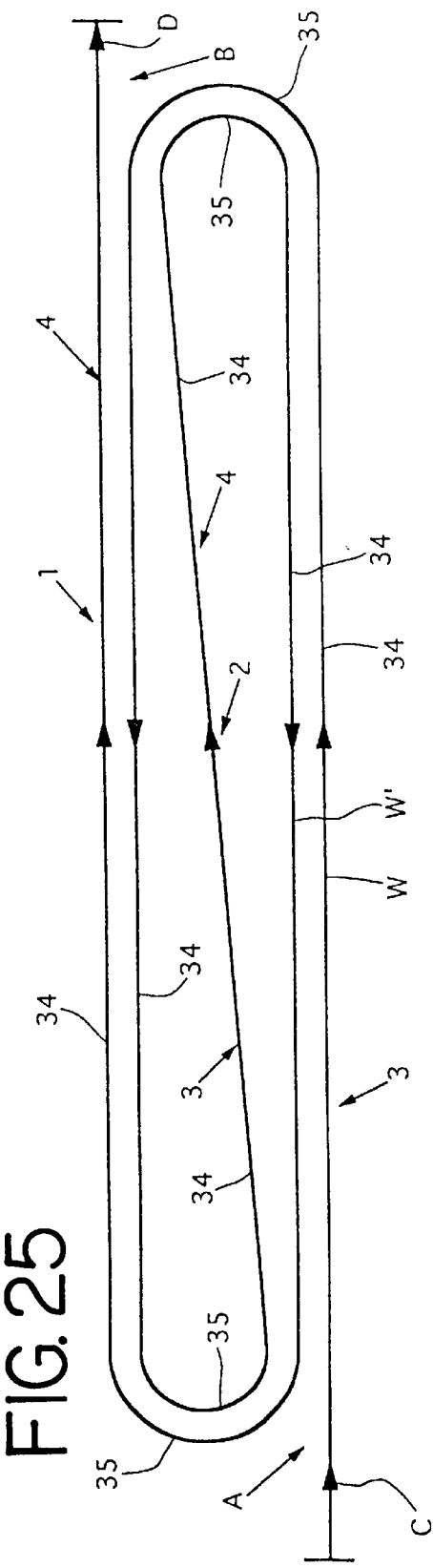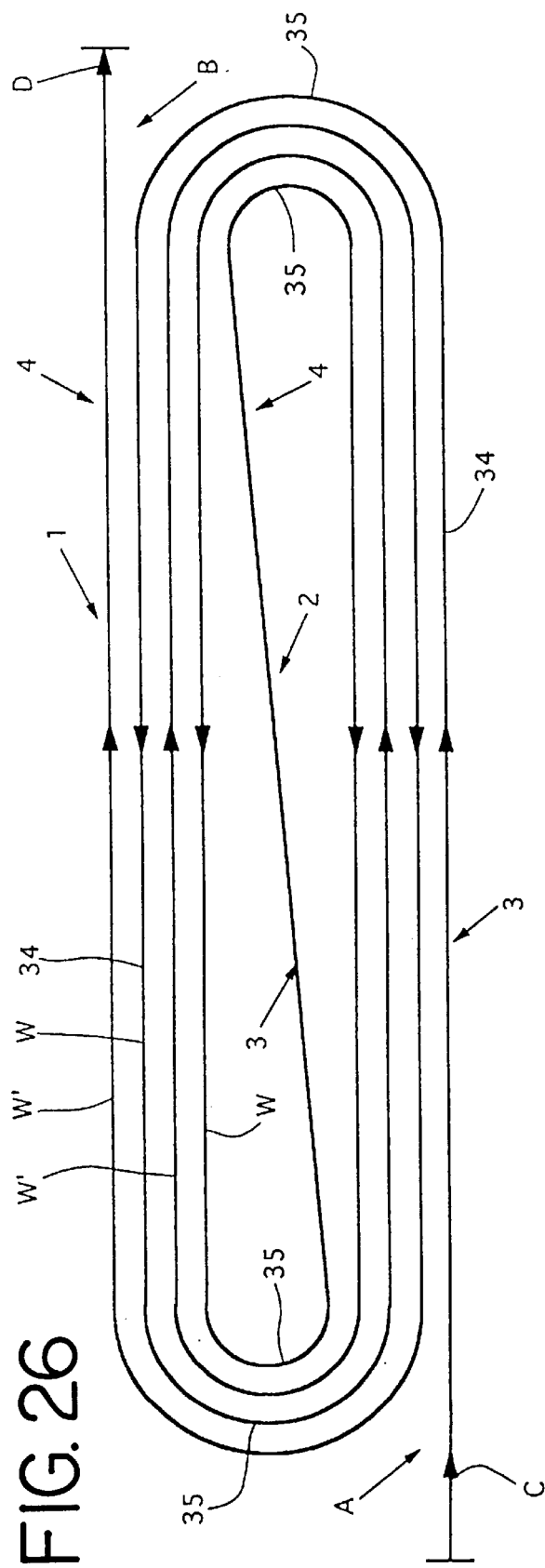

APPARATUS FOR CONVEYING ARTICLES, IN PARTICULAR SHEET-LIKE, FLEXIBLE, PRODUCTS

BACKGROUND OF THE INVENTION

The present invention relates to an apparatus for conveying articles. In particular the apparatus is for conveying sheet-like, flexible articles.

DE-C-3621834 discloses a conveying apparatus which is intended for the temporary storage of folded printed products. The conveying sections of this apparatus run either in loops or in the form of helixes (FIGS. 7 and 8). By virtue of this arrangement of the conveying sections, a large number of products can be accommodated in a small amount of space. Aside from this fact, the transporting arrangement which conveys the printed products can be compressed along the conveying sections to increase storage capacity. For this purpose, the transporting arrangement has to be designed correspondingly. Also, additional devices are necessary in order to compress the conveying arrangement and to extend it again.

Therefore it is an object of the present invention to provide a conveying apparatus which is designed with the lowest possible space requirement, and to be as long as possible so that as many articles as possible can be kept simultaneously in the given space.

SUMMARY OF THE INVENTION

This and other objects are accomplished with the present invention wherein the conveying section is routed along a path arranged in a spiral like manner. This permits the conveying section to be made as long as possible, with an extremely small space requirement. A conveying arrangement is provided for conveying the articles along the conveying section. In addition, an inlet for the conveying section is disposed about the center of the spiral.

In a preferred embodiment, two mutually concentric conveying sections are arranged such that they: (1) run in a spiral like manner; (2) have opposite conveying directions; (3) adjoin one another in the center; (4) have an inlet and an outlet offset towards the outside with respect to the center of the spiral; and (5) whose windings run in each conveying section between the windings of the other conveying section.

BRIEF DESCRIPTION OF THE DRAWINGS

Exemplary embodiments of the subject matter of the invention are explained in more detail below with reference to the schematic drawings.

FIGS. 16–18 show various possible uses of the conveying device according to FIG. 1.

FIGS. 25 & 26 show two variants of the preferred embodiments of the conveying device having a somewhat different progression of the conveying sections.

DETAILED DESCRIPTION OF THE PRESENTLY PREFERRED EMBODIMENTS

Figure 1:
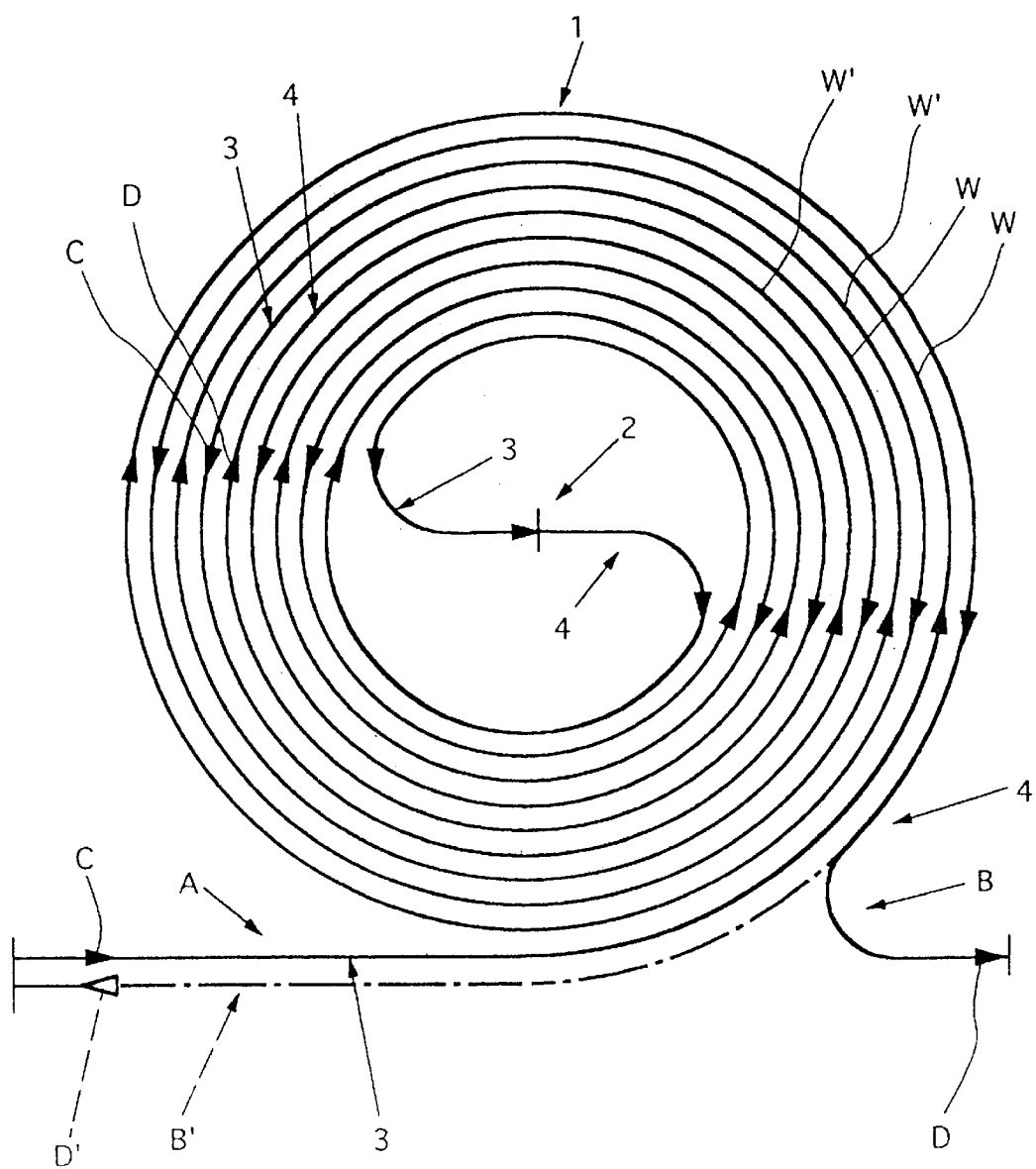
FIG. 1 shows a side view of the basic construction of a preferred embodiment of a conveying device.

FIG. 1 shows a simplified representation of a preferred embodiment of a conveying device 1, which is formed by two conveying sections 3, 4 (only shown schematically) running in the form of a spiral around a center 2. The first conveying section 3 runs from an inlet A, which is located on the outside with respect to the center 2, inwards in the form of a spiral towards the center 2. The conveying direction of the first conveying section 3 is designated by C.

The second conveying section 4 adjoins the first conveying section 3 in the center 2. The second conveying section 4 runs from the center 4 outwards to an outlet B. The outlet B is also located on the outside with respect to the center 2. The conveying direction D of the second conveying section 4 is counter to the conveying direction C of the first conveying section 3. However, the articles are conveyed in the same conveying direction (i.e. there is no reversal in the conveying direction). The two conveying sections 3, 4 are nested one inside the other. That is to say, the windings W of one conveying section 3 run in each case between the windings W' of the other conveying section 4 and vice versa.

As FIG. 1 shows, the inlet A and the outlet B are arranged on opposite sides, or alternatively on the same side, as is represented by chain-dotted lines (outlet B').

Figure 2:
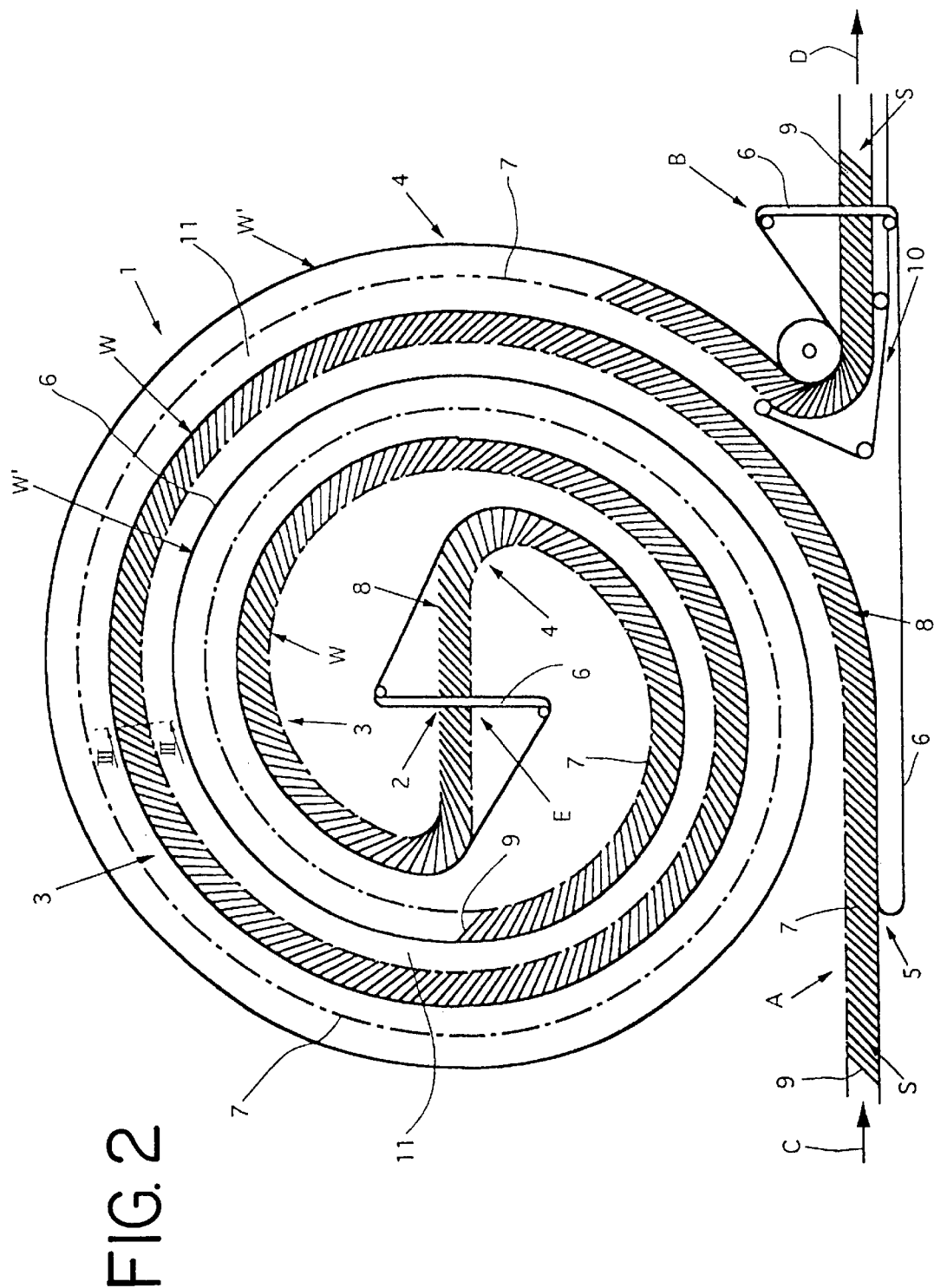
FIG. 2 shows, likewise in a side view and giving more details, the conveying device according to FIG. 1.

The conveying device according to FIG. 1 is represented in somewhat more detail in FIG. 2. It can be seen from FIG. 2 that, in order to convey the articles through the conveying sections 3, 4, a conveying arrangement 5 is provided which is active along the two conveying sections 3, 4. The conveying arrangement 5 comprises an endless conveying belt 6, which is driven in circulation (in a manner which is not illustrated in any more detail), and a roller path 7 (only shown schematically) which is arranged in a stationary manner on the inside with respect to conveying belt 6. The conveyable articles 8 which are to be guided through the conveying sections 3, 4 are received between the conveying belt 6 and the roller path 7 and are supported towards the center 2 by the roller path 7. In the center 2, the conveying belt 6 is reversed at the location designated by E, so that it is also located on the outer side of the conveyable articles 8 along the second conveying section 4.

In FIG. 2, the conveyable articles 8 are formed by printed products 9. In particular, the printed products 9 may be newspapers, periodicals, parts thereof and supplements therefor. The printed products 9 are fed in imbricated formation S. After having run through the conveying sections 3, 4, the printed products 9 leave the conveying device 1 at the outlet B in the same imbricated formation S. This means that the mutual position of the printed products 9 within the imbricated formation S does not alter as they run through the conveying sections 3, 4.

The printed products 9 leaving the conveying device 1 at the outlet B are conveyed away by a removal conveyor 10 (only shown schematically).

It can be seen from FIG. 2 that an interspace 11 is present between the windings W, W'. Put another way, interspace 11 is located between the conveying belt 6 and the stationary roller path 7 of the respectively outer windings W, W'. The size of interspace 11 is dependent on the thickness of the conveyable-article stream (i.e. on the thickness of the imbricated formation S).

Figure 3:
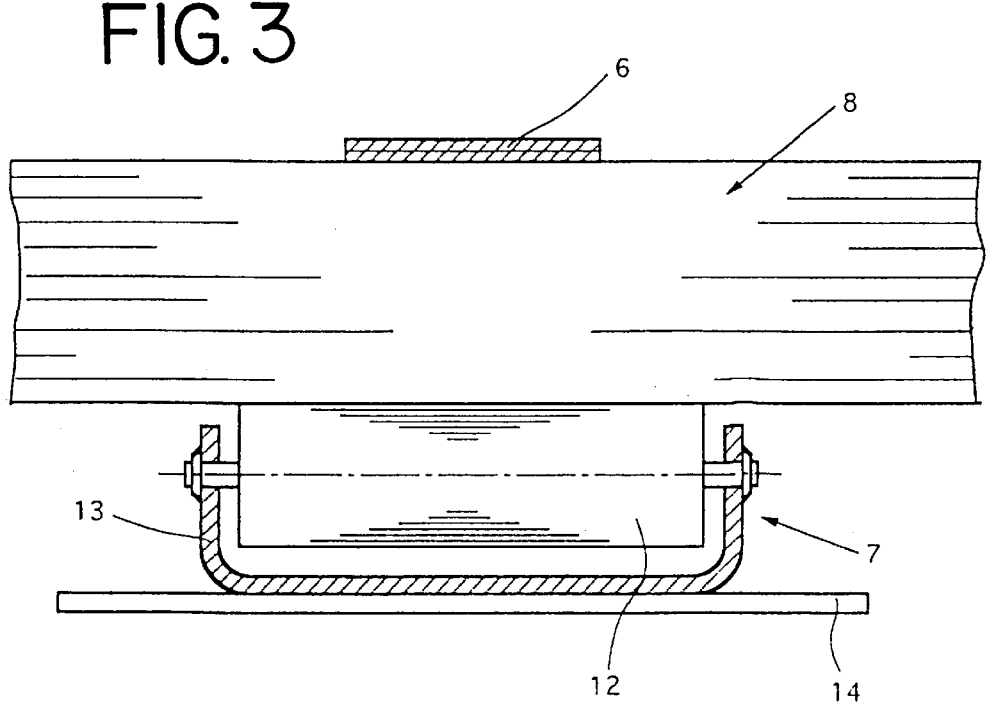
FIG. 3 shows a section along line III—III in FIG. 2.
Figure 4:
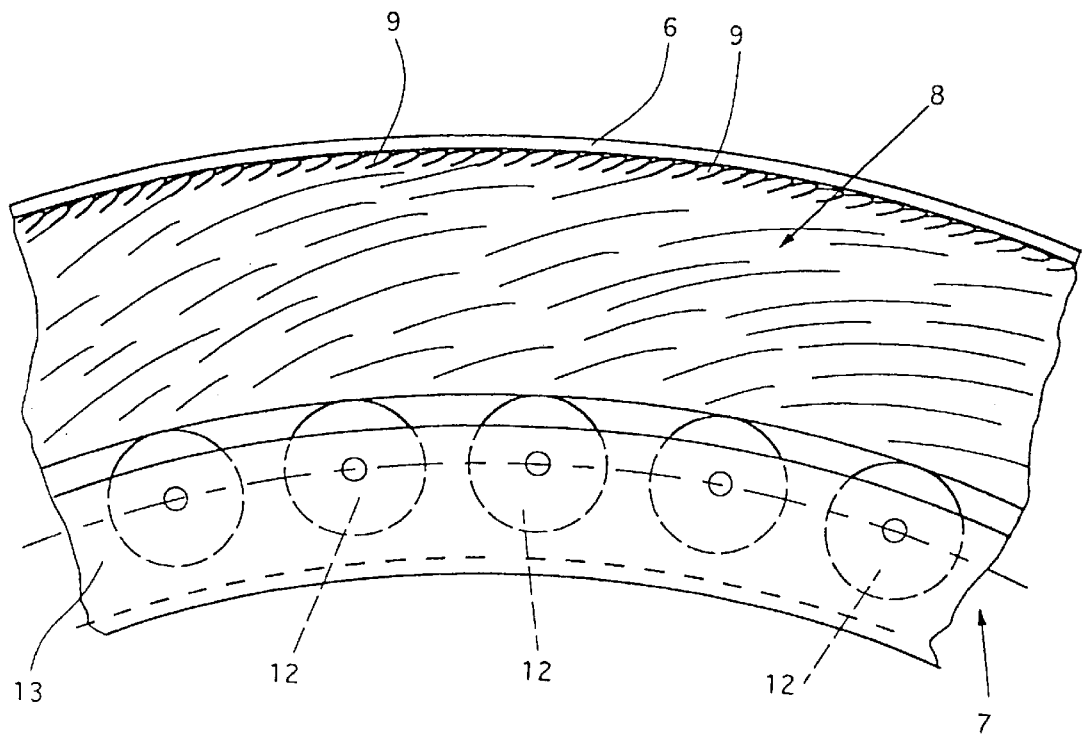
FIG. 4 shows a side view of FIG. 3.

The construction of the conveying arrangement 5 can be seen more precisely from FIGS. 3 and 4. The conveying belt 6 may be, for example, a flat belt, a round belt, or a toothed belt. The roller path 7 comprises a multiplicity of rollers 12 which are mounted freely rotatably in a mount 13. The mount 13 is fastened on a stationary support 14. The rollers 12 support the conveyable articles 8 towards the center 2 and are driven in rotation by the conveyable articles 8. The conveyable articles 8 are conveyed by the driven conveying belt 6.

Figure 5:
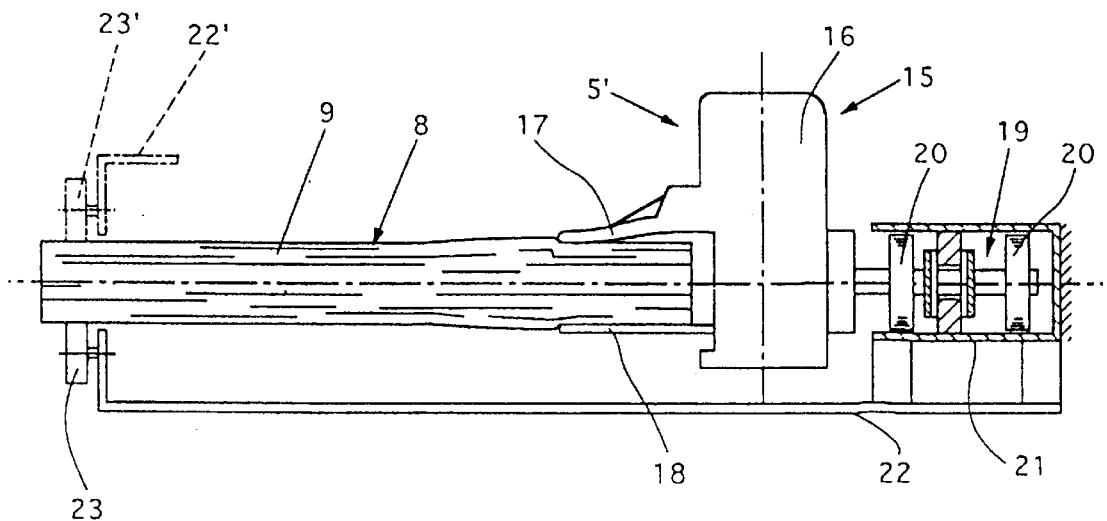
FIG. 5 shows, in a representation corresponding to FIG. 3, another embodiment of the conveying arrangement of the conveying sections.

FIG. 5 shows another embodiment of the conveying arrangement 8, which is designated by 5'. In order to convey the conveyable articles 8 along the conveying sections 3, 4, the conveying arrangement 5' concludes a gripper transporter 15 which is of a known type of construction. The gripper transporter 15 has grippers 16 which include a fixed gripper jaw 17 and a movable gripper jaw 18. The latter is locked in the clamping position shown in FIG. 5 and is released in order to free the conveyable articles 8. The grippers 16 are fastened one behind the other in the conveying direction on a link chain 19 which is guided in a channel 21 by running wheels 20. The channel 21 is fastened on a stationary supporting means 22.

On the side located opposite the grippers 16, the flexible conveyable articles 8 are supported by supporting rollers 23 which are mounted rotatably on the supporting means 22. If the conveyable articles 8 are located in the region above the horizontal center plane through the center 2 of the conveying device 1, then the supporting rollers act on the other side of the conveyable-article stream. This is indicated in FIG. 5 by the chain-dotted lines of roller 23' and supporting means 22'.

Figure 6:
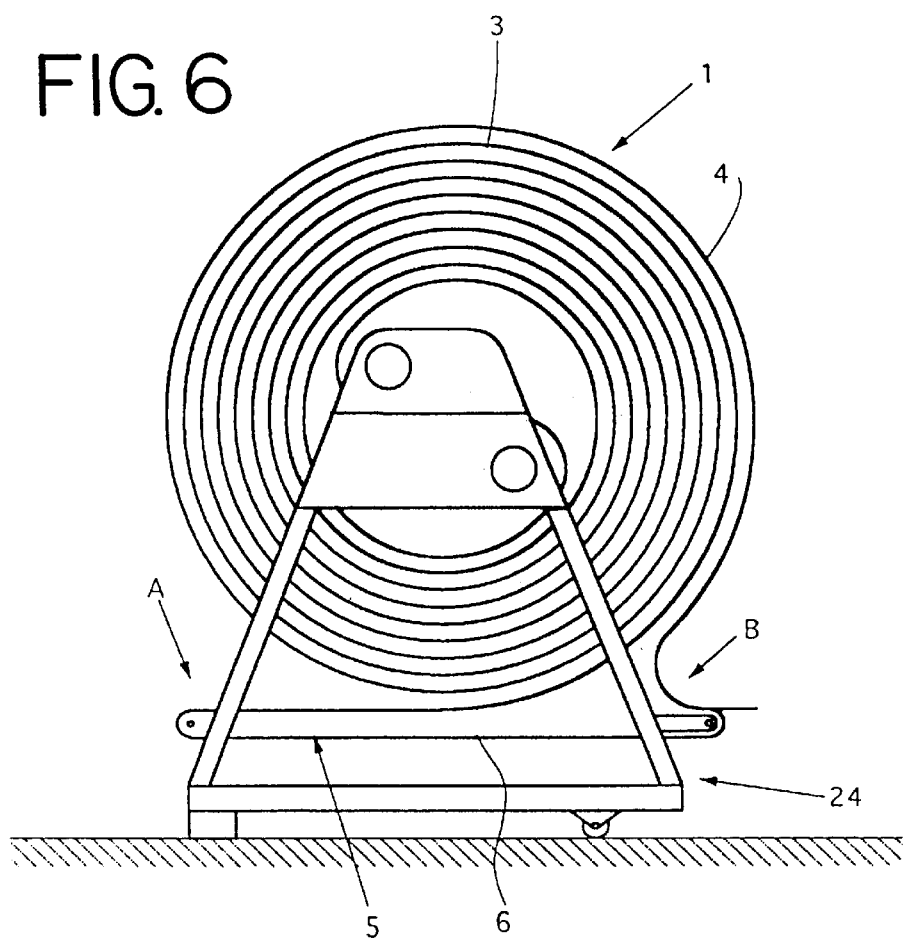
FIG. 6 shows a side view of a displaceable conveying device according to FIG. 1.

FIG. 6 shows an embodiment where the conveying device 1 is not arranged in a stationary manner, but is mounted in a displaceable or frame 24. The conveying device 1 can be moved to the respective location of use by the frame 24 and can be connected to a feed conveyor by the inlet A and to a removal conveyor by the outlet B. The drive unit for the conveying arrangement 5 for the two conveying sections 3, 4 may be mounted in the frame 24. Alternately, it can be provided in a stationary manner at the various locations of use (winding-up and/or unwinding station). In the latter case, each conveying arrangement 5 has to be coupled to the stationary drive unit.

Figure 7:
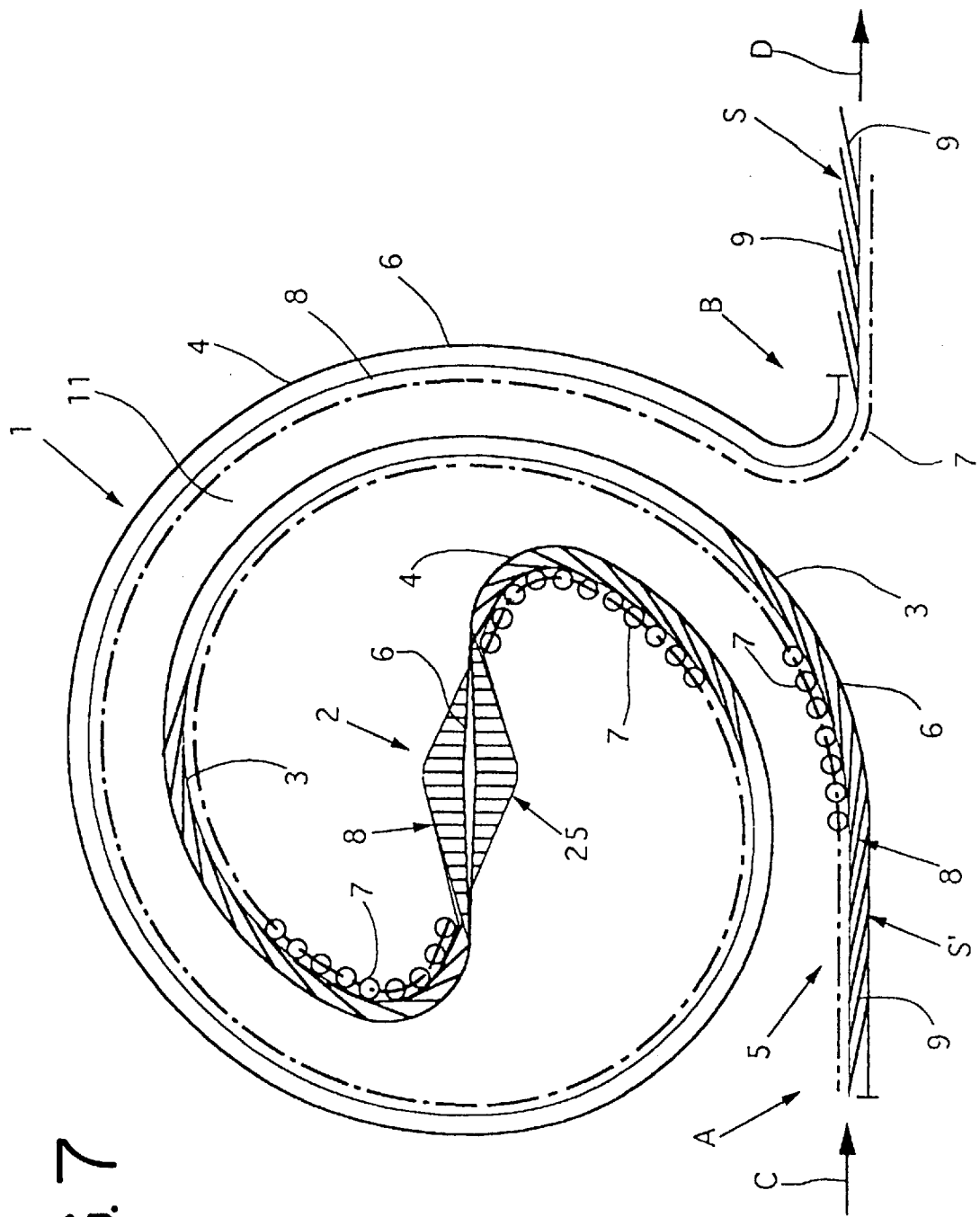
FIGS. 7 & 8 show variants of the conveying device shown in FIGS. 1–3.

The embodiment according to FIG. 7 differs from the embodiment described in FIGS. 1–4 in that a turning section 25 is provided in the center 2, in the transition region from the first conveying section 3 to the second conveying section 4. Along turning section 25, the conveyable-article stream 8 is turned through 180° about its longitudinal axis. This turning of the conveyable-article stream 8, as it runs through the turning section 25 achieves the situation where the printed products 9 assume an outgoing imbricated formation S which is different from that of the incoming imbricated formation S'. In the exemplary embodiment shown, each printed product in the incoming imbricated stream S' rests on the following printed product in the conveyable-article stream 8. This means that, in the outgoing imbricated stream S, which leaves the conveying device 1 at the outlet B, each printed product 9 rests on the preceding printed product.

It should also be mentioned that, in the conveying device 1 shown in FIG. 7, the conveying arrangement 5 is of the same design as in the embodiment according to FIGS. 1–4 (i.e. it includes a driven endless conveying belt 6 and a roller path 7). The embodiment in FIG. 7, however, has the advantage that the conveying belt 6 is not moved on to the other side of the conveying-article stream 8 in the center 2 as shown in FIG. 2 (turning location E).

Figure 8:
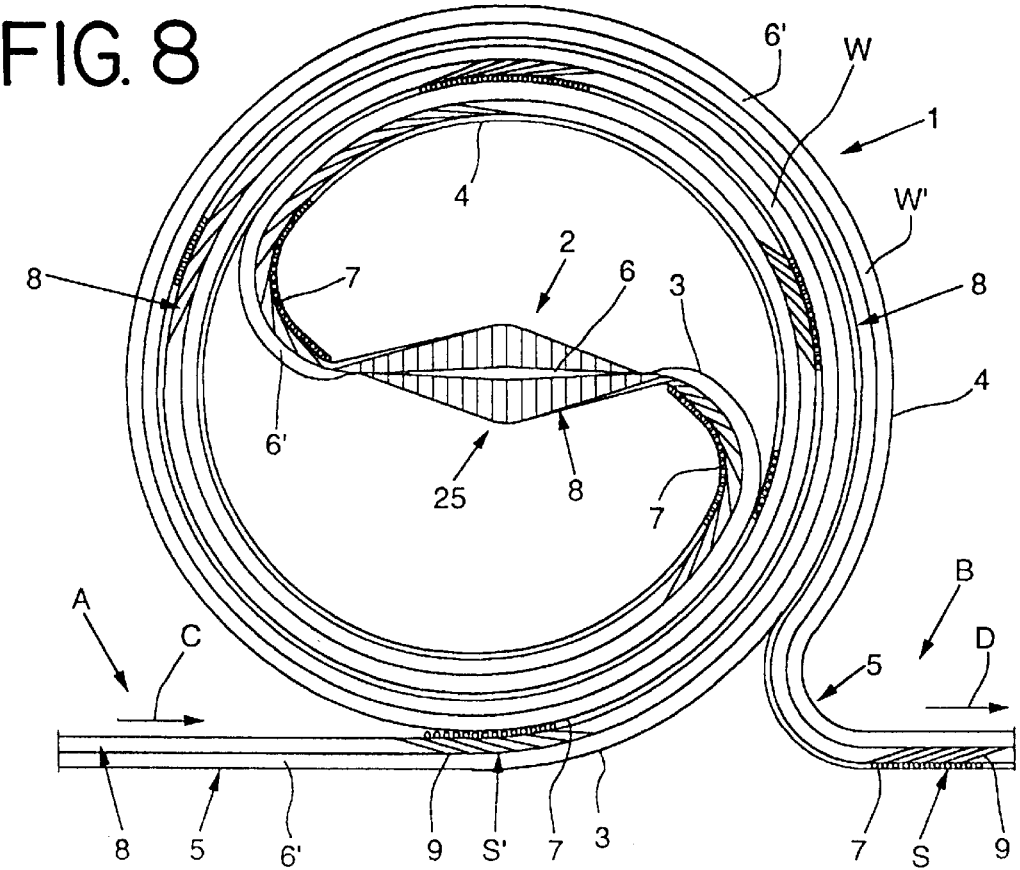
Figure 9:
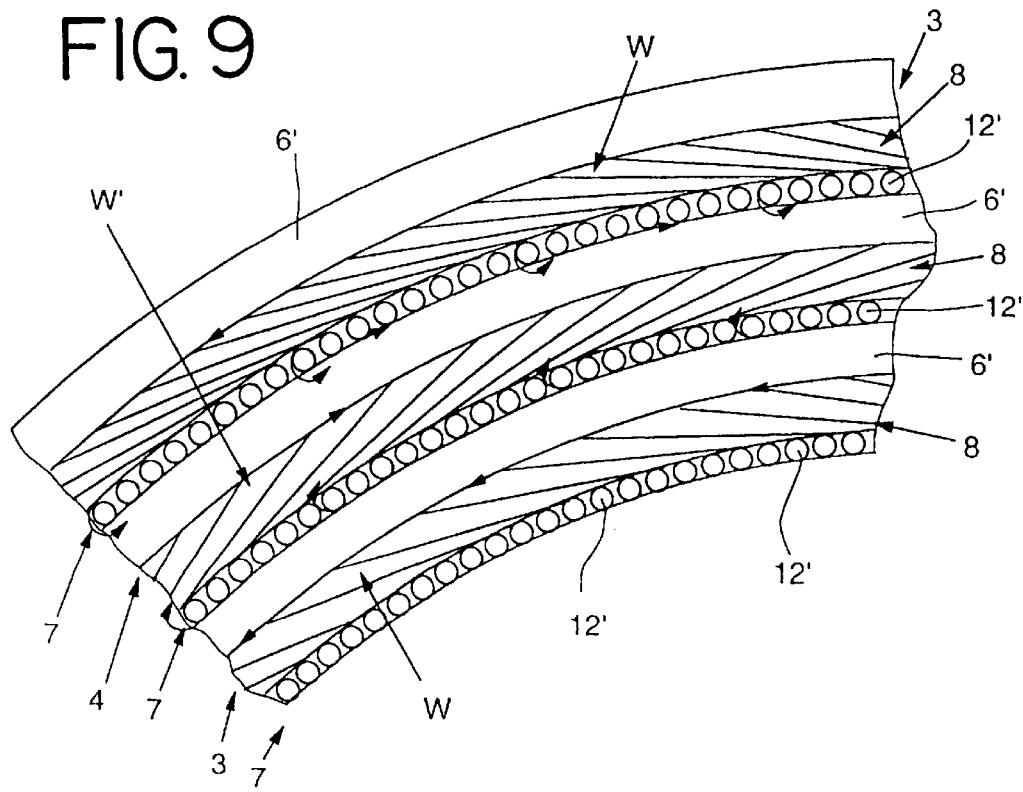
FIG. 9 shows a detail of FIG. 8, on an enlarged scale with respect to the latter.
Figure 10:
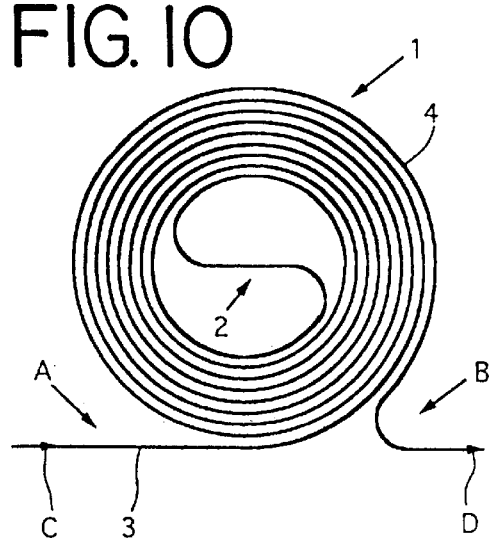
FIGS. 10–15 show, in a representation corresponding to FIG. 1, further variants of the conveying device according to FIG. 1.
Figure 11:
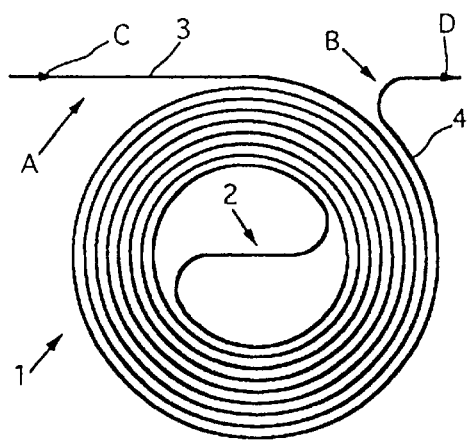

The conveying device 1 shown in FIG. 8 corresponds to the conveying device according to FIG. 7, with the exception of a different configuration of the conveying arrangement 5. In the conveying device 1 of FIG. 8, the conveying arrangement 5 still includes a roller path 7 on the side oriented towards the center 2. However, instead of a conveying belt with an essentially predetermined thickness, use is made in this embodiment of a likewise driven, endless band 6' which consists of an elastically compressible material. The band 6' is compressed to a greater or lesser extent depending on the thickness of the conveyable articles 8 (i.e. depending on the thickness of the imbricated streams S, S'). Thus, as can readily be seen from FIG. 9, it is possible to guide the band 6' in abutment against the rollers 12' of the roller path 7. The result is that the interspace 11 of the other embodiments is eliminated. This embodiment of FIG. 8 renders possible an even more compact type of construction. In addition, the rollers 12' are driven not only by the conveyed articles 8, but also directly by the abutting band 6' (as is indicated by the arrows in FIG. 9).

Figure 12:
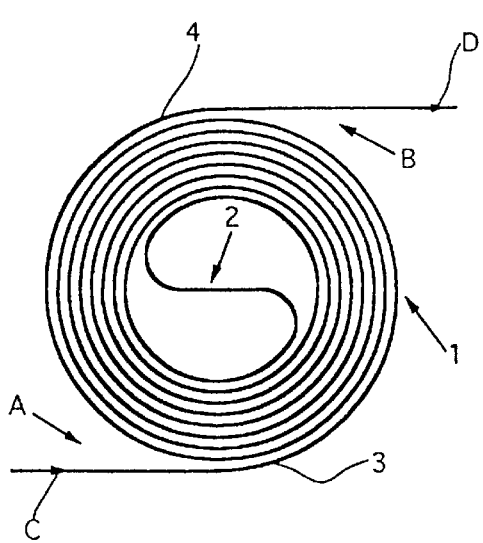
Figure 13:
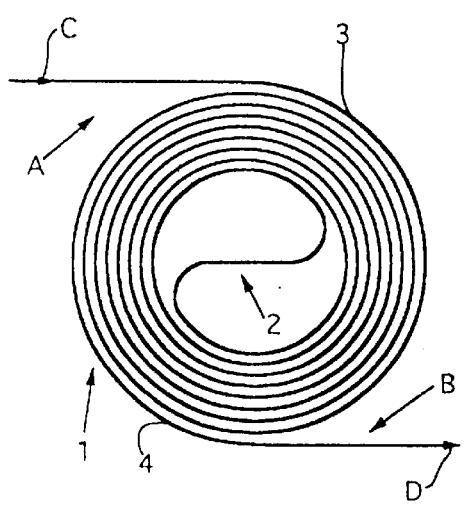
Figure 14:
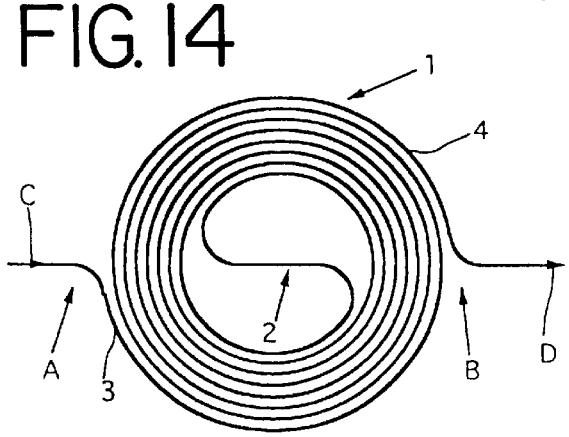
Figure 15:
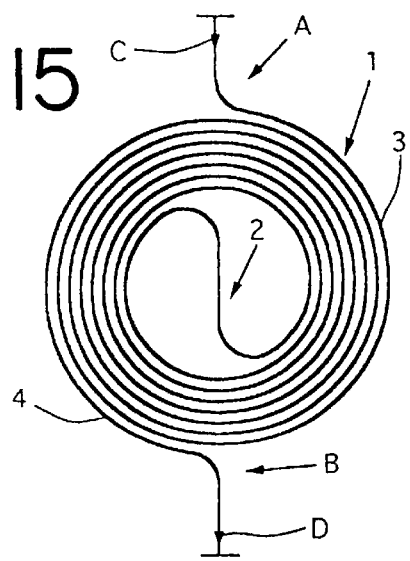

In a representation corresponding to FIG. 1, FIGS. 10–15 show, in a purely schematic manner, various possible ways of arranging the inlet and outlet of the conveying device 1. Thus, the inlet A and the outlet B may be arranged either both beneath (FIG. 10) or both above (FIG. 11) the conveying device 1. As FIGS. 12 and 13 show, the inlet A may be arranged beneath, and the outlet B above, the conveying device 1, or vice versa. In the case of the exemplary embodiments shown in FIGS. 14 and 15, the inlet A and the outlet B are located to the left and right, respectively, of the center 2 or above and below, respectively, the center 2.

In the embodiment according to FIG. 16, four conveying devices 1, 1', 1" and 1'" are arranged one behind the other. The articles running into the conveying device 1 at the inlet A run through the conveying devices 1, 1', 1" and 1'" one after the other and leave the conveying device 1'" at the outlet B'".

FIGS. 17 and 18 show two other possible uses of the conveying device 1. In FIG. 17, the conveying device 1 is arranged in parallel with a main conveying line 26. If the products running onto the main conveying device 26 are intended to run through the conveying device 1, the inlet A and the outlet B of the conveying device 1 are linked to the main conveying line 26 via diverters 27, 28 (only schematically indicated). In addition, there is also the possibility of linking the inlet A of the conveying device 1 to the main conveying line 26 only until such time as the conveying sections 3 and 4 are fully or partly filled with products, and then stopping the feed of products to the conveying sections. At a later point in time, by switching on the conveying arrangement 5, the products located in the conveying sections 3, 4 are discharged again to the main conveying line 26 via the outlet B. The conveying device 1 can thus be used either for run-through operation or for storage operation.

In contrast, in the embodiment according to FIG. 18, the conveying device 1 is designed only for storage or buffer operation. The inlet A and the outlet B of the conveying device 1 are positioned at the same location. By means of a band conveyor 29, the products which are to be stored are fed in the direction of the arrow C and run through the conveying sections 3, 4 by the conveying arrangement 5. In order to empty the conveying sections 3, 4, the conveying direction of the conveying arrangement 5, as well as that of the band conveyor 29, is reversed, and the products located in the conveying sections 3, 4 are conveyed out of the conveying device 1 in the direction of the arrow D.

Figure 19:
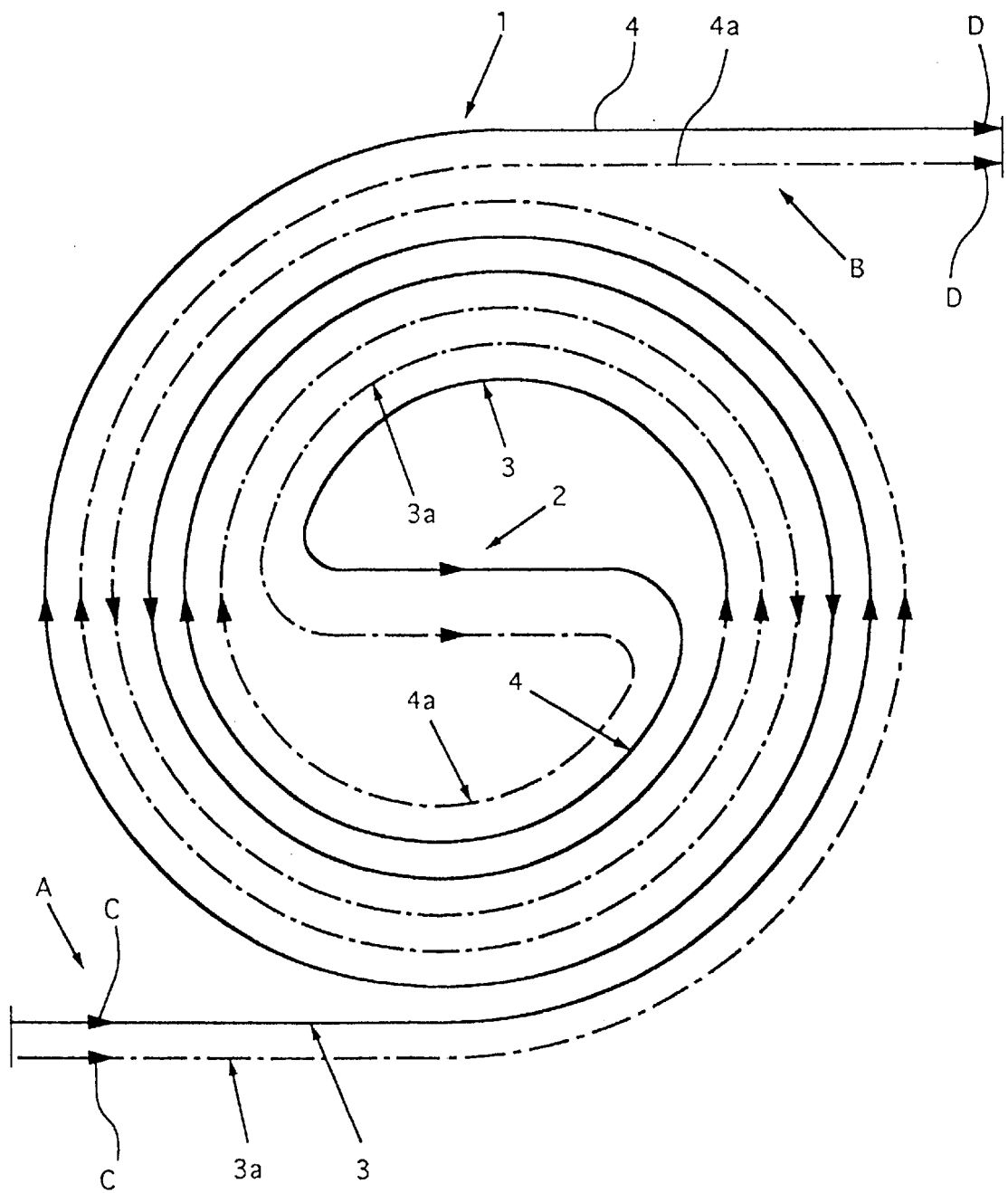
FIG. 19 shows a conveying device which corresponds to the conveying device according to FIG. 1 and has double conveying sections.

FIG. 19 shows a conveying device 1 which includes two mutually parallel conveying sections 3, 3a and 4, 4a. The mutually adjoining conveying sections 3, 4 and 3a, 4a have mutually independent conveying arrangements. The result is that they can be operated synchronously or else independently of one another.

The exemplary embodiments represented in FIGS. 20–23 differ from the exemplary embodiments according to FIGS. 1–19 in that the conveying device 1 includes only one conveying section 3, which runs in the form of a spiral around the center 2. In addition, the inlet is designated by A and the outlet of the conveying device 1 is designated by Bz. In the exemplary embodiments shown, the outlet Bz is located in the center 2, while the inlet A is offset towards the outside with respect to the center 2. It is, however, also conceivable to provide the inlet A of the conveying device 1 in the center 2, the outlet Bz then being located on the outside.

Figure 20A:
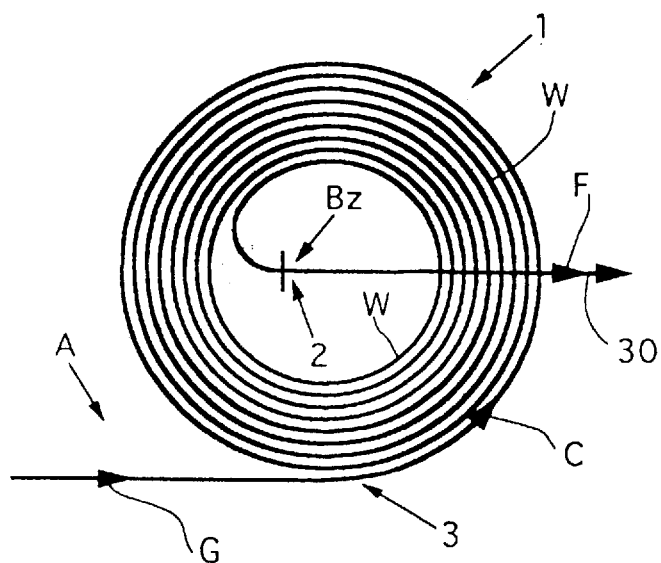
FIGS. 20a, 20b, 21a & 21b show a first embodiment
Figure 21A:
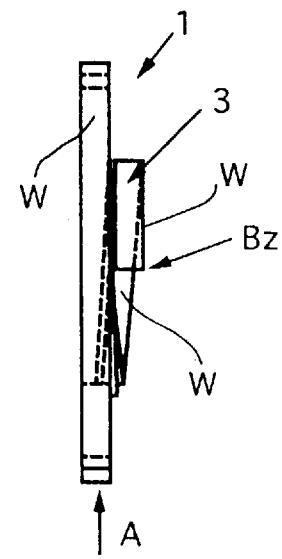
Figure 20B:
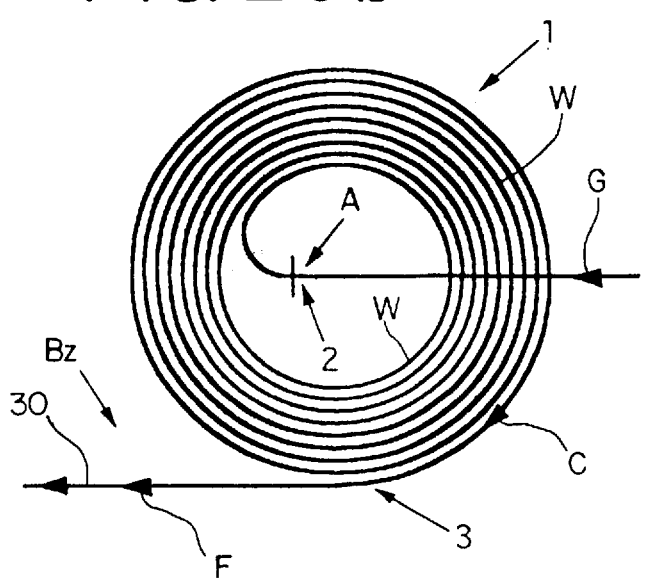
Figure 21B:
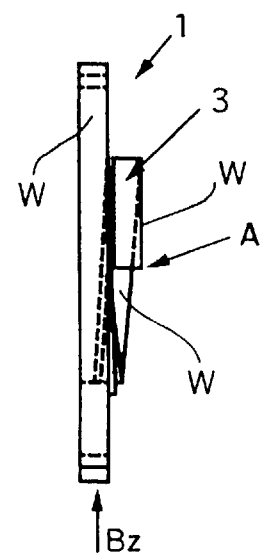

In the embodiment according to FIGS. 20a, 20b the windings W of the conveying section 3 are offset somewhat laterally with respect to one another (see FIGS. 21a, 21b). This results in the outlet (see FIG. 21a) or the inlet A (see FIG. 21b) being freely accessible from the side although it is located in the center 2 of the spiral formed by the conveying section 3. This makes it possible to guide away those articles leaving the conveying device 1 at the outlet Bz in a direction which runs essentially parallel to the feed direction G of the products fed to the conveying device 1. This can be seen from FIGS. 20a, 20b, in which a removal conveyor is designated by 30 with its conveying direction F essentially parallel to the feed direction G.

Figure 22:
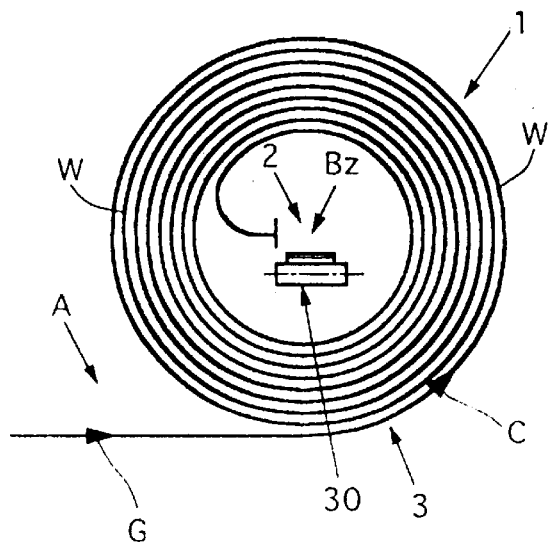
FIGS. 22 & 23 show a second embodiment of a conveying apparatus having only one conveying section running in the form of a spiral.

In the embodiment according to FIG. 22, the windings of the conveying section 3 are not offset laterally with respect to one another. The outlet Bz of the conveying device 1 is thus aligned with the windings W. Those products leaving the conveying section 3 can therefore only be guided away from the center 2 by means of a removal conveyor 30, of which the conveying direction F runs transversely (preferably approximately at right angles) with respect to the feed direction G. It can be seen from FIG. 22 that the products leaving the conveying device 1 at the outlet Bz are deposited onto the removal conveyor 30, preferably designed as a band conveyor.

Figure 23:
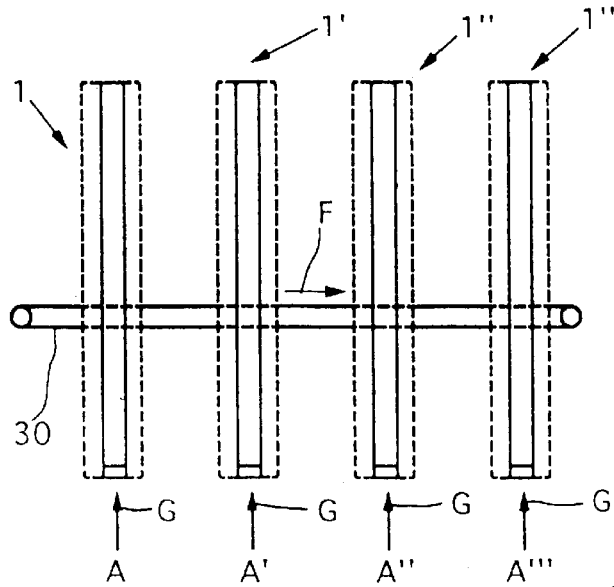

In the arrangement of FIG. 22, it is possible to assign a single removal conveyor 30 to a plurality of conveying devices 1, 1', 1" and 1'" as is shown in FIG. 23. By controlled unloading of the individual conveying arrangements 1, 1', 1" and 1'" (i.e. by corresponding and coordinated switching on and off of the conveying arrangements of the individual conveying devices 1, 1', 1" and 1'"), this embodiment makes it possible to collate on the removal conveyor 30 various products which originate from the various conveying devices 1, 1', 1" and 1'".

Figure 24:
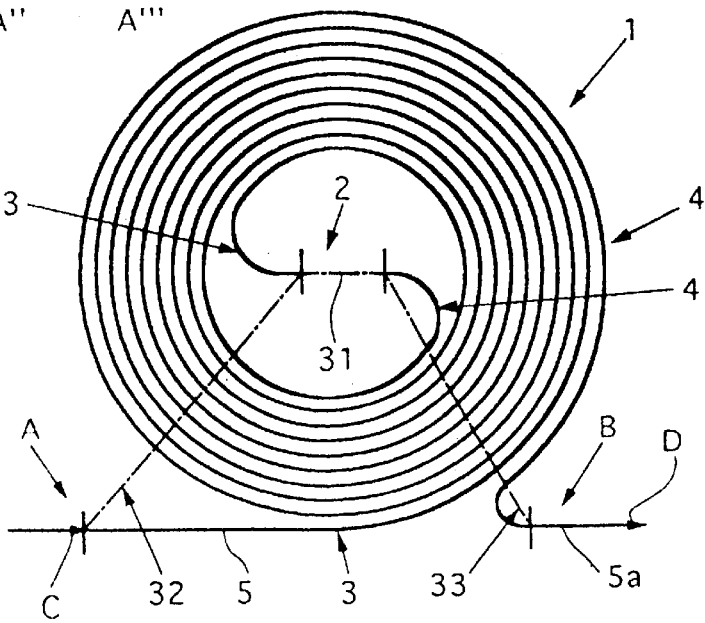
FIG. 24 shows a side view of a further variant of the conveying device shown in FIG. 1.

In the embodiments according to FIGS. 1–19, a single conveying arrangement 5 is provided in order to convey the products through the two conveying sections 3, 4. In the embodiment according to FIG. 24, two mutually separate conveying arrangements are provided, namely a conveying arrangement 5 for the conveying section 3 and a conveying arrangement 5a for the conveying section 4. In this embodiment, a transfer section 31 is arranged between the two conveying sections 3, 4. The drives for the separate conveying arrangements 5, 5a are only schematically indicated and are designated by 32 and 33, respectively. This embodiment makes it possible to operate the conveying sections 3, 4 independently of one another.

In the variants shown in FIGS. 25 and 26, the conveying sections 3, 4 do not, as in the embodiments described previously have a constant curvature. Instead, the conveying sections 3, 4 comprise rectilinear portions 34 and curved portions 35, by which the rectilinear portions 34 are connected to one another. However, here too, the conveying sections 3, 4 run in a spiral-like manner around a center 2. As is the case in the previously described embodiments, the windings W of one conveying section 3 are located between windings W' of the other conveying section 4 and vice versa.

Of course, it is also possible, in the case of the embodiments according to FIGS. 25 and 26, to provide only one conveying section 3 or 4, as has been described with reference to FIGS. 20a, 20b and 22.

In contrast with the previously described embodiments, the linear guidance, shown in FIGS. 25 and 26, of the conveying sections 3, 4 has the disadvantage that the flexible conveyable articles 8 are not constantly curved as they run through the conveying sections 3, 4. This disadvantage is particularly evident in the case of printed products 9.

The described routing of the conveying sections 3, 4 in a spiral-like manner permits an extremely compact arrangement of the conveying device 1.

It goes without saying that the conveying arrangements for conveying the articles through the conveying sections 3, 4 may also be designed differently to those described with reference to FIGS. 2–5. This applies, in particular, if the conveyable articles 8 are formed not by printed products 9, as illustrated, but by other types of articles.

The conveying devices 1 may actually be spatially arranged in any manner such as horizontally, vertically, or in an oblique position. The suitable spatial arrangement of the conveying device 1 depends, among other things, on the type of conveyable articles 8. If the latter are, as shown, printed products 9 which are conveyed through the conveying sections 3, 4, then an upright, vertical arrangement is most suitable. If, however, the articles to be conveyed are not flexible and cannot be clamped in (as shown) between a conveying belt 6 and a roller path 7, then a conveying device positioned in a lying, horizontal arrangement is better suited for this purpose. In the latter case, the conveying arrangement would then have to be designed so that the articles to be conveyed are rested on it and can be conveyed through the conveying sections in this manner.

Instead of being used, for example, for conveying printed products, the conveying device 1 may also be used for conveying articles which are to be dried through a drying chamber.

It will be understood that a wide range of changes and modifications to the embodiments described above will be apparent to those skilled in the art, and are also contemplated. It is therefore intended that the foregoing detailed description be regarded as illustrative rather than limiting, and that it be understood that it is the following claims, including all equivalents which are intended to define the spirit and scope of this invention.

I claim:

1. An apparatus for conveying articles comprising:

a conveying section which runs in a spiral like manner around a center, the conveying section having a stationary guide path supporting the articles towards the center;

a conveying arrangement adjacent the conveying section for conveying the articles along the conveying section, the conveying arrangement having an endless, driven conveying belt, the articles being arranged between the guide path and the conveying belt; and an inlet for the conveying section, the inlet being disposed about the center.

2. An apparatus according to claim 1, wherein the inlet for the conveying section is located on the outside with respect to the center.

3. An apparatus according to claim 1, wherein the inlet for the conveying section is located in the center.

4. An apparatus according to claim 1, wherein the conveying section comprises rectilinear portions and curved portions which connect the rectilinear portions to one another.

5. An apparatus according to claim 1, wherein the conveying section is constantly curved.

6. An apparatus according to claim 1 wherein:

the conveying section comprises a first conveying section and further comprising a second conveying section which runs in a spiral like manner, the second conveying section being concentric to the first conveying section and adjoining the first conveying section in the center;

the conveying arrangement is adjacent the first and second conveying sections for conveying the articles in a run-through direction along the first and second conveying sections, the run-through direction of the second conveying section running counter to the run-through direction of the first conveying section; and the apparatus further comprises an outlet for the second conveying section, both the inlet for the first conveying section and the outlet for the second conveying section being offset towards the outside with respect to the center and arranged one behind the other.

7. An apparatus according to claim 6, wherein the windings of the spiral of one conveying section run between the windings of the spiral of the other conveying section.

8. An apparatus according to claim 1 wherein, the stationary guide path includes a plurality of rollers for supporting the articles towards the center.

9. An apparatus according to claim 6 wherein, the stationary guide path includes a plurality of rollers for supporting the articles towards the center.

10. An apparatus according to claim 6, wherein the conveying arrangement conveys the articles along both the first and second conveying sections.

11. An apparatus according to claim 6, wherein the conveying arrangement includes a first and a second conveying arrangement, the first conveying arrangement conveying the articles along the first conveying section, and the second conveying arrangement conveying the articles along the second conveying section.

12. An apparatus according to claim 6, further comprising a turning section for turning the articles through 180° about an axis running parallel to the conveying direction, the turning section being located in the center between the first and second conveying sections.

13. An apparatus according to claim 1, wherein the conveying section further comprises first and second conveying sections with the second conveying section arranged adjacent to and running parallel to the first conveying section.

14. An apparatus according to claim 6, wherein the first and second conveying sections further comprise third and fourth conveying sections with the third and fourth conveying sections arranged adjacent to and running parallel to the first and second conveying sections.

15. An apparatus according to claim 1, further comprising an outlet for the conveying section located in the center, and a removal conveyor for receiving the articles leaving the outlet having a conveying direction which runs transversely with respect to the feed direction of the articles fed to the inlet.

16. An apparatus according to claim 15, wherein the removal conveyor is assigned jointly to a plurality of conveying sections arranged one beside the other.

17. An apparatus according to claim 1, further comprising an outlet for the conveying section located in the center, and the windings of the spiral of the conveying section are offset laterally with respect to one another such that the outlet is free at the side and adjoined by a removal conveyor having a conveying direction which runs parallel to the feed direction of the articles fed to the inlet.

18. An apparatus according to claim 1, wherein the conveying section is mounted to a displaceable frame.

19. An apparatus according to claim 6, wherein the first and second conveying sections are mounted to a displaceable frame.

20. An apparatus according to claim 6, wherein the first and second conveying sections are arranged adjacent to a main conveying section which moves the articles along a rectilinear path, and the inlet and the outlet of the first and second conveying sections can be optionally linked to the main conveying section for feeding the inlet with articles from the main conveying section and for discharging articles from the outlet to the main conveying section.

21. An apparatus according to claim 1, wherein the conveying section comprises a first conveying section and a second conveying section, and the conveying arrangement is driven in opposite directions in order to store articles in the first and second conveying sections which were fed into the inlet and, subsequently, to discharge the articles at the inlet.

22. An apparatus according to claim 1, wherein printed products are conveyed in an imbricated formation.

23. An apparatus according to claim 6, wherein printed products are conveyed in an imbricated formation.

24. An apparatus for conveying articles comprising:

a conveying section which runs in a spiral like manner around a center, the conveying section having a stationary guide path supporting the articles towards the center;

a conveying arrangement adjacent the conveying section for conveying the articles along the conveying section, the conveying arrangement having an endless, driven conveying band consisting of an elastically compressible material, the articles being arranged between the guide path and the conveying band; and an inlet for the conveying section, the inlet being disposed about the center.

25. An apparatus according to claim 24, wherein the inlet for the conveying section is located on the outside with respect to the center.

26. An apparatus according to claim 24, wherein the inlet for the conveying section is located in the center.

27. An apparatus according to claim 24, wherein the conveying section comprises rectilinear portions and curved portions which connect the rectilinear portions to one another.

28. An apparatus according to claim 24, wherein the conveying section is constantly curved.

29. An apparatus according to claim 24 wherein:

the conveying section comprises a first conveying section and further comprises a second conveying section which runs in a spiral like manner, the second conveying section being concentric to the first conveying section and adjoining the first conveying section in the center;

the conveying arrangement is adjacent the first and second conveying sections for conveying the articles in a run-through direction along the first and second conveying sections, the run-through direction of the second conveying section running counter to the run-through direction of the first conveying section; and the apparatus further comprises an outlet for the second conveying section, both the inlet for the first conveying section and the outlet for the second conveying section being offset towards the outside with respect to the center and arranged one behind the other.

30. An apparatus according to claim 29, wherein the windings of the spiral of one conveying section run between the windings of the spiral of the other conveying section.

31. An apparatus according to claim 24, wherein the stationary guide path includes a plurality of rollers for supporting the articles towards the center.

32. An apparatus according to claim 29, wherein the stationary guide path includes a plurality of rollers for supporting the articles towards the center.

33. An apparatus according to claim 29, wherein the conveying arrangement conveys the articles along both the first and second conveying sections.

34. An apparatus according to claim 29, wherein the conveying arrangement includes a first and a second conveying arrangement, the first conveying arrangement conveying the articles along the first conveying section, and the second conveying arrangement conveying the articles along the second conveying section.

35. An apparatus according to claim 29, further comprising a turning section for turning the articles through 180° about an axis running parallel to the conveying direction, the turning section being located in the center between the first and second conveying sections.

36. An apparatus according to claim 24, wherein the conveying section further comprises first and second conveying sections with the second conveying section arranged adjacent to and running parallel to the first conveying section.

37. An apparatus according to claim 29, wherein the first and second conveying sections further comprise third and fourth conveying sections with the third and fourth conveying sections arranged adjacent to and running parallel to the first and second conveying sections.

38. An apparatus according to claim 24, further comprising an outlet for the conveying section located in the center, and a removal conveyor for receiving the articles leaving the outlet having a conveying direction which runs transversely with respect to the feed direction of the articles fed to the inlet.

39. An apparatus according to claim 38, wherein the removal conveyor is assigned jointly to a plurality of conveying sections arranged one beside the other.

40. An apparatus according to claim 24, further comprising an outlet for the conveying section located in the center, and the windings of the spiral of the conveying section are offset laterally with respect to one another such that the outlet is free at the side and adjoined by a removal conveyor having a conveying direction which runs parallel to the feed direction of the articles fed to the inlet.

41. An apparatus according to claim 24, wherein the conveying section is mounted to a displaceable frame.

42. An apparatus according to claim 29, wherein the first and second conveying sections are mounted to a displaceable frame.

43. An apparatus according to claim 29, wherein the first and second conveying sections are arranged adjacent to a main conveying section which moves the articles along a rectilinear path, and the inlet and the outlet of the first and second conveying sections can be optionally linked to the main conveying section for feeding the inlet with articles from the main conveying section and for discharging articles from the outlet to the main conveying section.

44. An apparatus according to claim 24, wherein the conveying section comprises a first conveying section and a second conveying section, and the conveying arrangement is driven in opposite directions in order to store articles in the first and second conveying sections which were fed into the inlet and, subsequently, to discharge the articles at the inlet.

45. An apparatus according to claim 24, wherein printed products are conveyed in an imbricated formation.

46. An apparatus according to claim 29, wherein printed products are conveyed in an imbricated formation.

* * * * *